United States Patent
Ye et al.

(10) Patent No.: US 9,939,975 B2
(45) Date of Patent: Apr. 10, 2018

(54) DETERMINING TOUCH TERMINAL AND ACTIVE STYLUS TARGET OPERATING FREQUENCY ACCORDING TO NOISE INFORMATION

(71) Applicant: Shenzhen Goodix Technology Co., Ltd., Shenzhen, Guangdong (CN)

(72) Inventors: Jinchun Ye, Guangdong (CN); Shu Pang, Guangdong (CN); Qin Liu, Guangdong (CN); MengTa Yang, Guangdong (CN)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 14 days.

(21) Appl. No.: 15/029,254

(22) PCT Filed: Jul. 9, 2014

(86) PCT No.: PCT/CN2014/081899
§ 371 (c)(1),
(2) Date: Apr. 14, 2016

(87) PCT Pub. No.: WO2015/055024
PCT Pub. Date: Apr. 23, 2015

(65) Prior Publication Data
US 2016/0239123 A1    Aug. 18, 2016

(30) Foreign Application Priority Data
Oct. 14, 2013  (CN) .......................... 2013 1 0479021

(51) Int. Cl.
G06F 3/033   (2013.01)
G06F 3/044   (2006.01)
(Continued)

(52) U.S. Cl.
CPC .......... *G06F 3/044* (2013.01); *G06F 3/03545* (2013.01); *G06F 3/0416* (2013.01)

(58) Field of Classification Search
CPC ........ G06F 3/03; G06F 3/033; G06F 3/03545; G06F 3/041; G06F 3/0412; G06F 3/044; G06F 3/047
(Continued)

(56) References Cited

U.S. PATENT DOCUMENTS 9,369,827 B2 *  6/2016  Cheng .................... H04B 15/00
9,632,598 B1 *  4/2017  Sundara-Rajan ... G06F 3/03545
(Continued)

FOREIGN PATENT DOCUMENTS

CN    102087565 A    6/2011
CN    102830837 A    12/2012
(Continued)

OTHER PUBLICATIONS

Office Action for corresponding Chinese Application No. 201310479021.1, Applicant: Shenzhen Huiding Technology Co., Ltd., dated Jan. 24, 2017, 9 pages.
(Continued)

Primary Examiner — Alexander Eisen
Assistant Examiner — Nelson Lam

(57) ABSTRACT

A touch terminal, an active stylus detection method, and a system are disclosed. The method includes the following steps: separately scanning, by a touch screen controller, multiple pieces of noise information on multiple operating frequencies of an active stylus of a touch screen; determining, by the touch screen controller, a target operating frequency according to the multiple pieces of noise information; and sending, by the touch screen controller, the target operating frequency to the active stylus, and adjusting an operating frequency of the active stylus to the target oper-
(Continued)

ating frequency, so that the active stylus and the touch screen operate jointly at the target operating frequency. In the method, the touch screen controller scans noise information on multiple operating frequencies of the active stylus, so as to determine a target operating frequency of the active stylus, so that the active stylus operates at the target operating frequency.

35 Claims, 11 Drawing Sheets

(51) Int. Cl.
G06F 3/041 (2006.01)
G06F 3/0354 (2013.01)
(58) Field of Classification Search
USPC ................................. 345/156–158, 173–179
See application file for complete search history.

(56) References Cited

U.S. PATENT DOCUMENTS

| | | | |
|---|---|---|---|
| 9,864,465 B2* | 1/2018 | Ye | G06F 3/0418 |
| 2005/0189154 A1* | 9/2005 | Perski | G06F 3/0418 |
| | | | 178/18.06 |
| 2011/0254807 A1* | 10/2011 | Perski | G06F 3/0418 |
| | | | 345/174 |
| 2012/0105362 A1* | 5/2012 | Kremin | G06F 3/03545 |
| | | | 345/174 |
| 2012/0327042 A1* | 12/2012 | Harley | G06F 3/044 |
| | | | 345/179 |
| 2013/0027361 A1* | 1/2013 | Perski | G06F 3/0418 |
| | | | 345/178 |
| 2013/0106722 A1* | 5/2013 | Shahparnia | G06F 3/03545 |
| | | | 345/173 |
| 2013/0106795 A1* | 5/2013 | Sundara-Rajan | G06F 3/0412 |
| | | | 345/179 |
| 2013/0106797 A1* | 5/2013 | Pant | G06F 3/0383 |
| | | | 345/179 |
| 2013/0207938 A1* | 8/2013 | Ryshtun | G06F 3/0416 |
| | | | 345/179 |
| 2013/0300696 A1* | 11/2013 | Haran | G06F 3/041 |
| | | | 345/173 |
| 2014/0098033 A1* | 4/2014 | Simmons | G06F 3/03545 |
| | | | 345/173 |
| 2014/0099894 A1* | 4/2014 | Singh | H04M 1/72527 |
| | | | 455/41.2 |
| 2015/0002444 A1* | 1/2015 | Brunet | G06F 3/0416 |
| | | | 345/174 |
| 2015/0109263 A1* | 4/2015 | Hargreaves | G06F 3/03545 |
| | | | 345/179 |
| 2015/0193025 A1* | 7/2015 | Rebeschi | G06F 3/03545 |
| | | | 345/174 |
| 2015/0286297 A1* | 10/2015 | Cheong | G06F 3/0418 |
| | | | 345/179 |
| 2015/0363012 A1* | 12/2015 | Sundara-Rajan | G06F 3/038 |
| | | | 345/179 |
| 2016/0004338 A1* | 1/2016 | Hsu | G06F 3/03545 |
| | | | 345/173 |
| 2017/0285772 A1* | 10/2017 | Yamamoto | G06F 3/0383 |

FOREIGN PATENT DOCUMENTS

| | | |
|---|---|---|
| CN | 102866792 A | 1/2013 |
| CN | 103309529 A | 9/2013 |
| CN | 101893979 A | 6/2014 |
| EP | 0526007 A2 | 2/1993 |

OTHER PUBLICATIONS

International Search Report of PCT Patent Application No. PCT/CN2014/081899 dated Sep. 26, 2014.

* cited by examiner

- ━━━━━ Optical clear adhesive (OCA)
- ━━━━━ Driving and sensing electrodes (Driver & Sensor ITO)
- ━━━━━ Shielding layer (Shielding ITO)
- ─────── Flexible printed circuit (FPC)

--Prior Art--

--Prior Art--

DETERMINING TOUCH TERMINAL AND ACTIVE STYLUS TARGET OPERATING FREQUENCY ACCORDING TO NOISE INFORMATION

TECHNICAL FIELD

The present invention relates to the field of computer technologies, and more particularly to a touch terminal, an active stylus detection method, and a system.

BACKGROUND

Capacitive touch screens have become standard input devices for mobile electronic devices. Controllers for driving capacitive touch screens generally have a frequency hopping function. Active styluses have gradually appeared on the market in recent two years. For example, HTC, Ntrig, and Goodix all have launched their active stylus products. An active stylus needs to be used with a capacitive touch screen. FIG. 1 is a schematic structural view of a touch screen. As shown in FIG. 1, the main components are two sheets of glass. The upper glass is a Coverlens that serves as a touch surface and also has a protection function. The lower layer of glass is a sensor substrate, with driving electrodes and sensing electrodes distributed on an upper surface, and a shielding layer (optional) distributed on a lower surface. The two sheets of glass are usually attached together by means of an ultraviolet (UV) adhesive or an optical clear adhesive (OCA). A flexible printed circuit (FPC) with a capacitive touch screen control integrated circuit (IC) and a peripheral circuit is bonded to the driving and sensing electrodes.

FIG. 2 is a schematic view of Driving & Sensor electrodes that form a vertical intersection matrix structure. As shown in FIG. 2, a capacitive touch screen subsystem needs to detect a touch of a hand and a touch of an active stylus. The two types of detection correspond to different modes. When a finger touch operation is detected, as shown in FIG. 3, the driving electrodes generate a driving signal, and the sensing electrodes receive the driving signal. When the active stylus is detected, as shown in FIG. 4, the driving electrodes are connected to a sensing circuit unit through a multiplexing circuit, the sensing electrodes are also connected to the sensing circuit unit through the multiplexing circuit, and the driving electrodes and the sensing electrodes occupy the sensing circuit unit in different time periods.

An existing system composed of an active stylus and a capacitive screen employs only one-way communication from the active stylus to the capacitive touch screen, and cannot implement communication from the capacitive touch screen to the active stylus.

Such communication mode causes various problems to the application of the active stylus. For example, interference of different frequencies, typically liquid crystal display (LCD) interference, exists on different mobile products. A solution in the prior art is that for a specific customer project, an active stylus pre-appoints a frequency f without interference as an operating frequency of the stylus. Taking two projects as an example, it is possible that the stylus of project 1 needs to operate at frequency f1, while the stylus of project 2 needs to operate at frequency f2. In this way, stylus produced by even one manufacturer cannot be used universally, bringing a lot of inconvenience to the producer and users. An existing practice is that a stylus may generate different frequencies according to a user's selection, for example, selection made by the user through a key. For example, the operating frequency is switched once by pressing one key until the touch screen normally responds to the operation of the active stylus. Such practice alleviates the problem to a certain degree but still requires user intervention.

SUMMARY

The objective of the present invention is to solve at least one of the foregoing technical defects.

Accordingly, an objective of the present invention is to provide a detection method. The detection method has advantages of being convenient in use and not requiring appointment of an operating frequency by a touch screen and an active stylus.

Another objective of the present invention is to provide a detection system.

Still another objective of the present invention is to provide a touch terminal.

Yet another objective of the present invention is to provide an active stylus.

Still another objective of the present invention is to provide a detection method.

To achieve the foregoing objective, in one aspect, an embodiment of the present invention provides a detection method, including the following steps: separately scanning, by a touch screen controller, multiple pieces of noise information on multiple operating frequencies of an active stylus of a touch screen; determining, by the touch screen controller, a target operating frequency according to the multiple pieces of noise information; and sending, by the touch screen controller, the target operating frequency to the active stylus, and adjusting an operating frequency of the active stylus to the target operating frequency, so that the active stylus and the touch screen operate jointly at the target operating frequency.

In the method according to the embodiment of the present invention, the touch screen controller scans noise information on multiple operating frequencies of the active stylus, so as to determine a target operating frequency of the active stylus, so that the active stylus operates at the target operating frequency. In this way, use by a user is facilitated, the efficiency of communication between the active stylus and a touch screen terminal is improved, and active styluses with different frequencies are all applicable to the touch screen.

In an embodiment of the present invention, the method further includes: receiving, by the touch screen controller, a driving signal and a communication coded signal that are sent by the active stylus after the active stylus is frequency-adjusted to the target operating frequency; and performing, by the touch screen controller, frame synchronization with the active stylus according to the driving signal and the communication coded signal, and acquiring touch information of the active stylus.

In an embodiment of the present invention, an operating mode of the touch screen includes a finger mode, a stylus mode, and a hybrid mode, and the touch screen controller controls, according to a detected finger touch signal or stylus touch signal, the operating mode of the touch screen to switch between the finger mode, the stylus mode, and the hybrid mode.

In an embodiment of the present invention, after the touch screen enters the finger mode, the method further includes: performing, by the touch screen controller, finger scanning in subsequent time slices.

In an embodiment of the present invention, after the touch screen enters the stylus mode, the method further includes:

detecting, by the touch screen controller, an excitation signal and a coded signal of the active stylus in subsequent time slices.

In an embodiment of the present invention, after the touch screen enters the hybrid mode, the method further includes: performing, by the touch screen controller, finger scanning in an Nth time slice, and in an (N+1)th time slice, sending the target operating frequency and detecting a state of the active stylus to generate the stylus touch signal.

In an embodiment of the present invention, the sending, by the touch screen controller, the target operating frequency to the active stylus specifically includes: coding, by the touch screen controller, the target operating frequency and generating a corresponding pulse signal; and sending, by the touch screen controller, the corresponding pulse signal to the active stylus through the touch screen.

In an embodiment of the present invention, the sending, by the touch screen controller, the corresponding pulse signal to the active stylus through the touch screen specifically includes: sending, by the touch screen controller, the corresponding pulse signal to the active stylus through the touch screen at an operating frequency other than the target operating frequency.

In an embodiment of the present invention, the coding, by the touch screen controller, the target operating frequency and generating the corresponding pulse signal specifically includes: controlling, by the touch screen controller, a first area of the touch screen to send the pulse signal, and controlling a second area of the touch screen to send a reverse-phase pulse signal that has the same frequency as but an opposite phase to the pulse signal.

In an embodiment of the present invention, the first area is an upper half screen of the touch screen, and the second area is a lower half screen of the touch screen.

In an embodiment of the present invention, the second area is an area, of the touch screen, in contact with a palm of a user, and the first area is an area not in contact with the palm of the user.

In an embodiment of the present invention, the active stylus acquires the target operating frequency according to the number of pulses.

In an embodiment of the present invention, the active stylus acquires the target operating frequency by means of quadrature demodulation.

To achieve the foregoing objective, in another aspect, an embodiment of the present invention provides a detection system, including:

a touch terminal, configured to separately scan multiple pieces of noise information on multiple operating frequencies of an active stylus of a touch screen, and determine a target operating frequency according to the multiple pieces of noise information; and the active stylus, configured to receive the target operating frequency sent by the touch terminal, and adjust an operating frequency of the active stylus to the target operating frequency, so that the active stylus and the touch terminal operate jointly at the target operating frequency.

In the system according to the embodiment of the present invention, the touch screen controller scans noise information on multiple operating frequencies of the active stylus, so as to determine a target operating frequency of the active stylus, so that the active stylus operates at the target operating frequency. In this way, use by a user is facilitated, the efficiency of communication between the active stylus and a touch screen terminal is improved, and active styluses with different frequencies are all applicable to the touch screen.

In an embodiment of the present invention, the touch terminal is further configured to receive a driving signal and a communication coded signal that are sent by the active stylus after the active stylus is adjusted to the target operating frequency, and perform frame synchronization with the active stylus according to the driving signal and the communication coded signal, so as to acquire touch information of the active stylus.

In an embodiment of the present invention, an operating mode of the touch terminal includes a finger mode, a stylus mode, and a hybrid mode, the touch terminal includes a touch screen controller, and the touch screen controller controls, according to a detected finger touch signal or stylus touch signal, the operating mode of the touch screen to switch between the finger mode, the stylus mode, and the hybrid mode.

In an embodiment of the present invention, after the touch terminal enters the finger mode, the touch terminal performs finger scanning in subsequent time slices.

In an embodiment of the present invention, after the touch terminal enters the stylus mode, the touch terminal detects an excitation signal and a coded signal of the active stylus in subsequent time slices.

In an embodiment of the present invention, after the touch terminal enters the hybrid mode, the touch terminal performs finger scanning in an Nth time slice, and in an (N+1)th time slice, sends the target operating frequency and detects a state of the active stylus to generate the stylus touch signal.

In an embodiment of the present invention, the touch screen controller codes the target operating frequency and generates a corresponding pulse signal, and sends the corresponding pulse signal to the active stylus.

In an embodiment of the present invention, the touch screen controller sends the corresponding pulse signal to the active stylus at an operating frequency other than the target operating frequency.

In an embodiment of the present invention, the touch screen controller is further configured to control a first area of the touch screen to send the pulse signal, and control a second area of the touch screen to send a reverse-phase pulse signal that has the same frequency as but an opposite phase to the pulse signal.

In an embodiment of the present invention, the first area is an upper half screen of the touch screen, and the second area is a lower half screen of the touch screen.

In an embodiment of the present invention, the second area is an area, of the touch screen, in contact with a palm of a user, and the first area is an area not in contact with the palm of the user.

In an embodiment of the present invention, the touch screen acquires the target operating frequency according to the number of pulses.

In an embodiment of the present invention, the active stylus acquires the target operating frequency by means of quadrature demodulation.

To achieve the foregoing objective, in still another aspect, an embodiment of the present invention provides a touch terminal, including: a touch screen, configured to detect touch information of a user; and a touch screen controller, configured to scan multiple pieces of noise information on multiple operating frequencies of an active stylus of the touch screen, so as to determine a target operating frequency, and send the target operating frequency to the active stylus.

In the touch terminal according to the embodiment of the present invention, the touch screen controller scans noise information on multiple operating frequencies of the active stylus, so as to determine a target operating frequency of the active stylus, so that the active stylus operates at the target operating frequency. In this way, use by a user is facilitated, the efficiency of communication between the active stylus and a touch screen terminal is improved, and active styluses with different frequencies are all applicable to the touch screen.

In an embodiment of the present invention, the touch screen controller is further configured to receive a driving signal and a communication coded signal that are sent by the active stylus after the active stylus is adjusted to the target frequency, so as to acquire touch information of the active stylus.

In an embodiment of the present invention, an operating mode of the touch screen includes a finger mode, a stylus mode, and a hybrid mode, and the touch screen controller controls, according to a detected finger touch signal or stylus touch signal, the operating mode of the touch screen to switch between the finger mode, the stylus mode, and the hybrid mode.

In an embodiment of the present invention, when the operating mode of the touch screen is the finger mode, the touch screen controller performs finger scanning in subsequent time slices.

In an embodiment of the present invention, when the operating mode of the touch screen is the stylus mode, the touch screen controller detects an excitation signal and a coded signal of the active stylus in subsequent time slices.

In an embodiment of the present invention, when the operating mode of the touch screen is the hybrid mode, the touch screen controller performs finger scanning in an Nth time slice, and in an (N+1)th time slice, sends the target operating frequency and detects a state of the active stylus to generate the stylus touch signal.

In an embodiment of the present invention, the touch screen controller is further configured to control a first area of the touch screen to send the pulse signal, and control a second area of the touch screen to send a reverse-phase pulse signal that has the same frequency as but an opposite phase to the pulse signal.

In an embodiment of the present invention, the first area is an upper half screen of the touch screen, and the second area is a lower half screen of the touch screen.

In an embodiment of the present invention, the second area is an area, of the touch screen, in contact with a palm of the user, and the first area is an area not in contact with the palm of the user.

In an embodiment of the present invention, the touch screen controller includes a driving circuit, a timing control circuit, a multiplexer, a sensing circuit, and an operation decision module, the sensing circuit is configured to receive touch information detected by the touch screen; the operation decision module is configured to identify a touch mode of the user according to the touch signal so as to switch the operating mode of the touch screen; and the timing control circuit is configured to control the driving circuit and the multiplexer to generate a timing signal on the touch screen so as to control the touch screen.

To achieve the foregoing objective, in yet another aspect, an embodiment of the present invention provides an active stylus, including: a receiving unit, configured to receive a communication signal sent by a capacitive touch screen; a decoding unit, configured to decode the communication signal so as to obtain a target operating frequency of the active stylus; a signal generation unit, configured to generate a communication coded signal and an excitation signal; a sending unit, configured to send the communication coded signal and the driving signal to a touch terminal; and a microprocessor, configured to control, according to the target operating frequency, the signal generation unit to generate the communication coded signal and the excitation signal.

In the active stylus according to the embodiment of the present invention, a target operating frequency of the active stylus is obtained from the touch terminal, and data and touch information are sent to the touch terminal at the target operating frequency. In this way, the efficiency of communication between the active stylus and the touch terminal is improved, and it is unnecessary to manually adjust an operating frequency of the active stylus, so that use by a user is facilitated.

In an embodiment of the present invention, the microprocessor is further configured to control the sending unit to send multiple operating frequencies of the active stylus to the touch terminal.

In an embodiment of the present invention, the microprocessor is further configured to adjust an operating frequency of the active stylus to the target operating frequency, so that the microprocessor controls the signal generation unit according to the target operating frequency.

In an embodiment of the present invention, after the active stylus establishes frame synchronization with the touch terminal, the sending unit is configured to send a touch signal to the touch terminal.

To achieve the foregoing objective, in still another aspect, an embodiment of the present invention provides a detection method, including the following steps: detecting, by an active stylus, a communication signal sent by a touch terminal; parsing, by the active stylus, the communication signal to determine a target operating frequency; and adjusting, by the active stylus, an operating frequency to the target operating frequency, so that the active stylus and the touch screen operate jointly at the target operating frequency.

In the detection method according to the embodiment of the present invention, a target operating frequency of an active stylus is obtained from a touch terminal, and data and touch information are sent to the touch terminal at the target operating frequency. In this way, the efficiency of communication between the active stylus and the touch terminal is improved, and it is unnecessary to manually adjust an operating frequency of the active stylus, so that use by a user is facilitated.

In an embodiment of the present invention, the detecting, by the active stylus, the communication signal sent by the touch terminal specifically includes: sending multiple operating frequencies of the active stylus to the touch terminal, so that the touch terminal determines the target operating frequency, codes the target operating frequency and sends the obtained communication signal to the active stylus.

In an embodiment of the present invention, the active stylus and the touch screen operating jointly at the target operating frequency specifically includes: establishing, by the active stylus, frame synchronization with the touch terminal according to the target operating frequency, so that the active stylus and the touch screen operate jointly at the target operating frequency.

Additional aspects and advantages of the present invention will be set forth in part in the following description, or may be obvious from the description, or may be learned through practice of the present invention.

BRIEF DESCRIPTION OF THE DRAWINGS

The aforementioned and/or additional aspects and advantages of the present invention will become apparent and easily understandable in the following description of the embodiments in conjunction with the accompanying drawings, in which.

DETAILED DESCRIPTION

Figure 1:
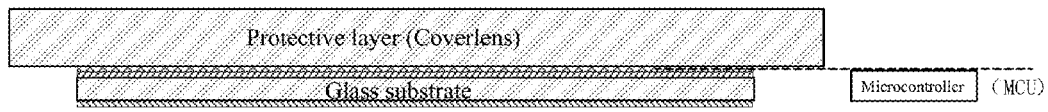
FIG. 1 is a schematic structural view of a touch screen.
Figure 2:
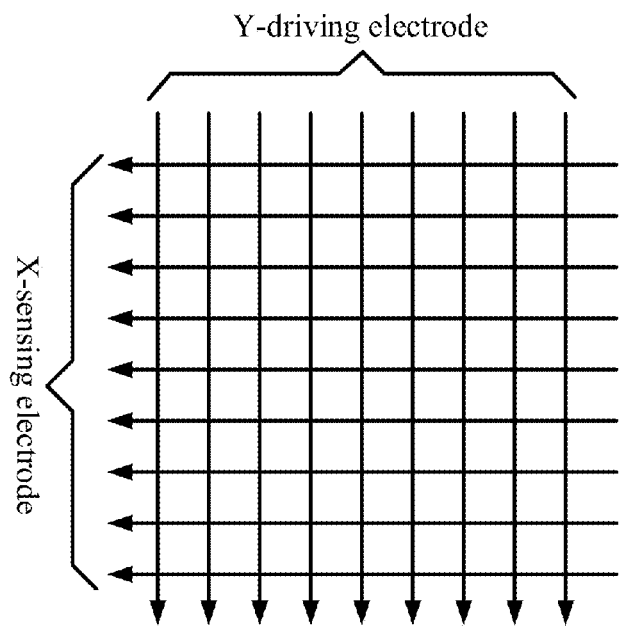
FIG. 2 is a schematic view of Driving & Sensor electrodes that form a vertical intersection matrix structure.
Figure 3:
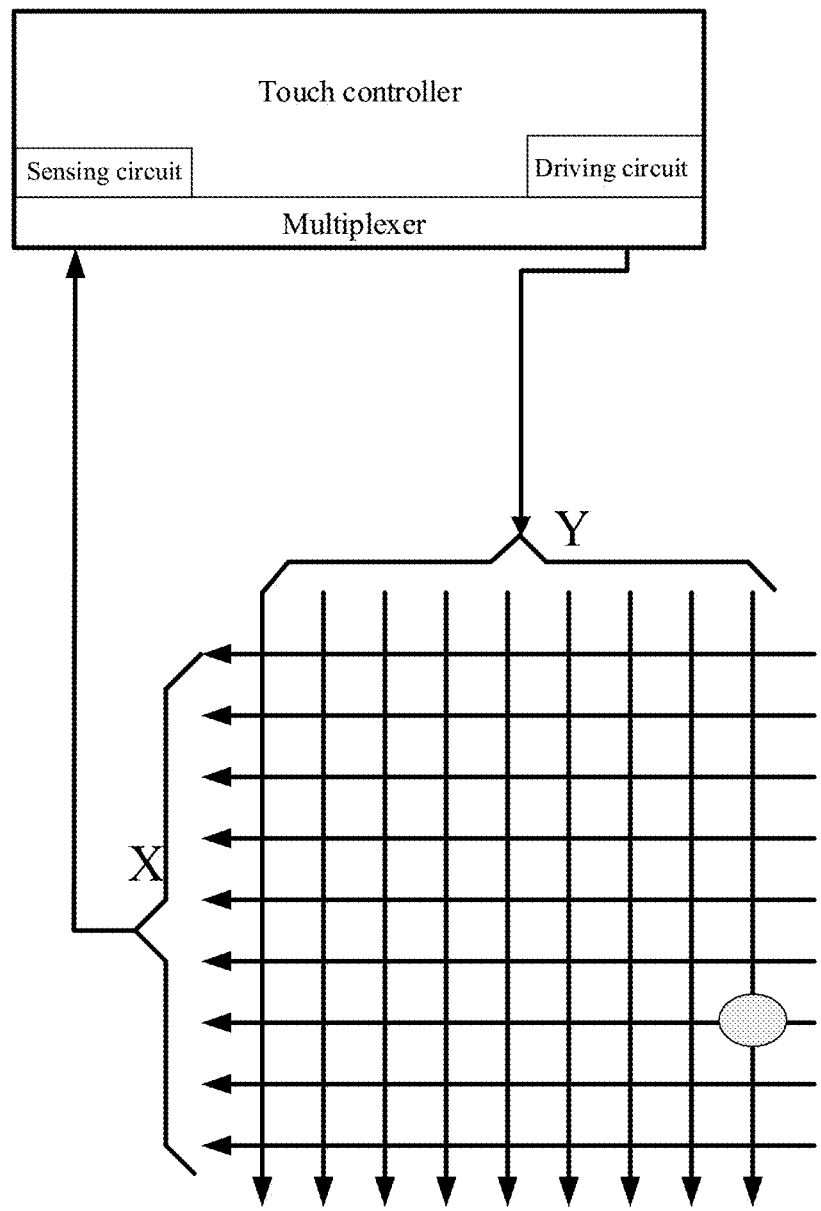
FIG. 3 is a schematic view of detection of a finger touch operation.
Figure 4:
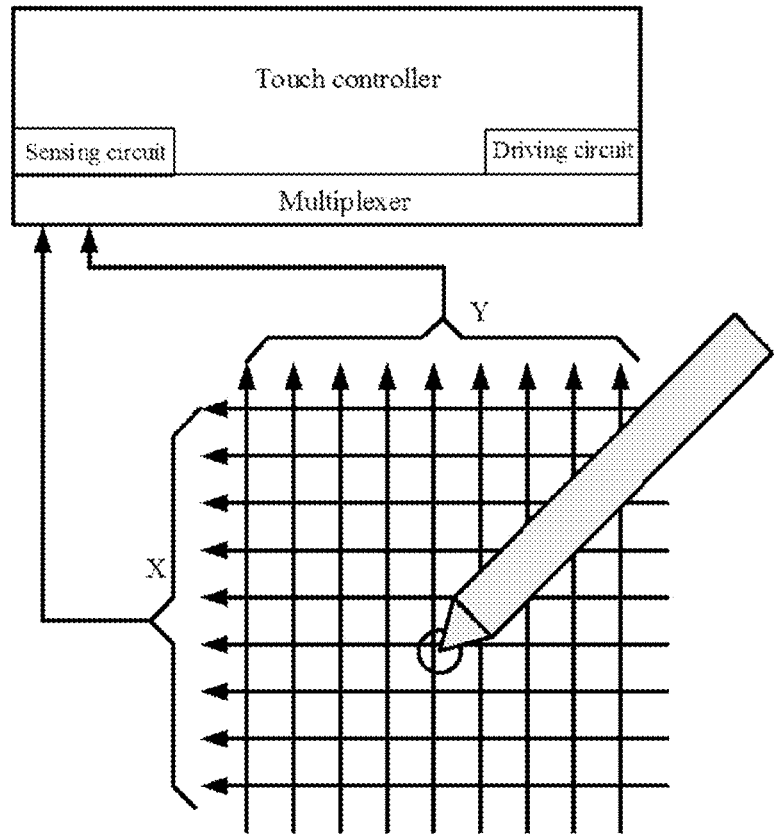
FIG. 4 is a schematic view of detection of an active stylus.

Embodiments of the present invention are described in detail below and examples of the embodiments are illustrated in the drawings, where same or similar reference numerals are used throughout to indicate same or similar elements or elements with same or similar functions. The embodiments described below with reference to the drawings are exemplary, which are used to illustrate the present invention, but shall not be construed to limit the present invention.

It should be understood that in the description of the present invention, terms such as "first" and "second" are used for purpose of description only and are not intended to indicate or imply relative importance or significance or to imply the number of indicated technical features. Thus, the feature defined with "first" and "second" may explicitly or implicitly include one or more of this feature. In the description of the present invention, "multiple" means two or more than two, unless specified otherwise.

Figure 5:
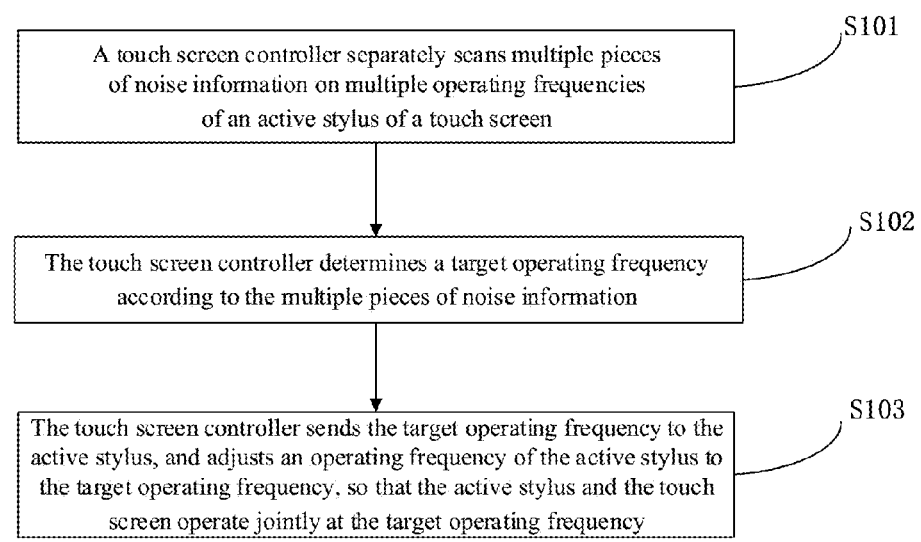
FIG. 5 is a flow chart of a detection method according to an embodiment of the present invention.

FIG. 5 is a flow chart of a detection method according to an embodiment of the present invention. As shown in FIG. 5, the detection method according to the embodiment of the present invention includes the following steps.

Step S101: A touch screen controller separately scans multiple pieces of noise information on multiple operating frequencies of an active stylus of a touch screen.

Step S102: The touch screen controller determines a target operating frequency according to the multiple pieces of noise information.

Step S103: The touch screen controller sends the target operating frequency to the active stylus, and adjusts an operating frequency of the active stylus to the target operating frequency, so that the active stylus and the touch screen operate jointly at the target operating frequency. The active stylus acquires the target operating frequency according to the number of pulses, and the active stylus acquires the target operating frequency by means of quadrature demodulation.

In the detection method according to the embodiment of the present invention, the touch screen controller scans noise information on multiple operating frequencies of the active stylus, so as to determine a target operating frequency of the active stylus, so that the active stylus operates at the target operating frequency. In this way, use by a user is facilitated, the efficiency of communication between the active stylus and a touch screen terminal is improved, and active styluses with different frequencies are all applicable to the touch screen.

The detection method of the present invention will be described in detail below with reference to the drawings.

Figure 6:
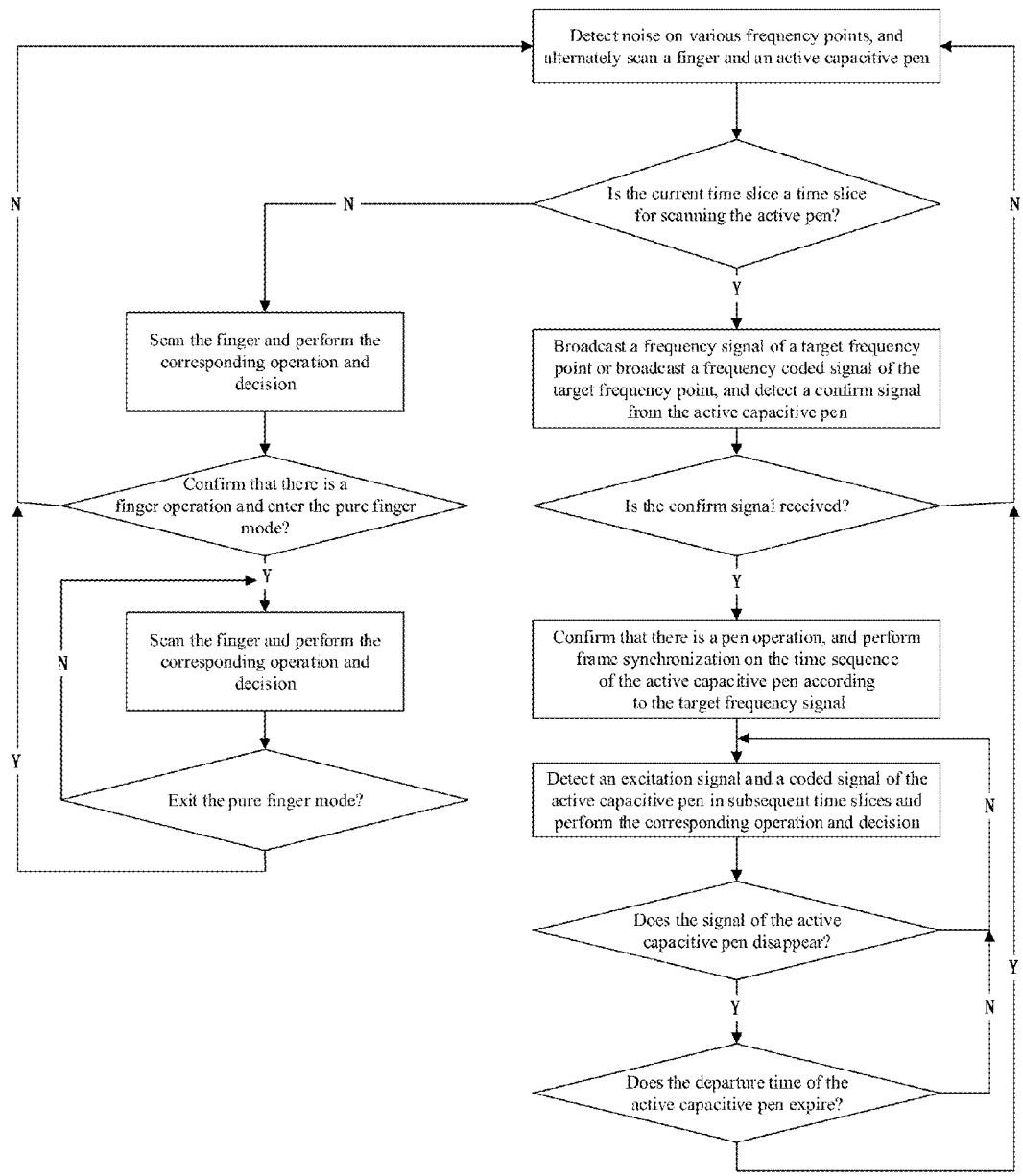
FIG. 6 is an operational flow chart of a touch screen according to an embodiment of the present invention.

In the embodiment of the present invention, an operating mode of the touch screen includes a finger mode, a stylus mode, and a hybrid mode, and the touch screen controller controls, according to a detected finger touch signal or stylus touch signal, the operating mode of the touch screen to switch between the finger mode, the stylus mode, and the hybrid mode. As shown in FIG. 6, when a current operation mode (a finger operation or an active stylus operation) of a user is not determined, a finger signal and a stylus touch signal of the active stylus are detected in turn based on time slices, so as to determine a touch mode of the user. When the touch mode of the user is the stylus mode, the touch screen controller detects an excitation signal and a coded signal of the active stylus in subsequent time slices, and performs frame synchronization in time sequence with the active stylus so as to decode touch information and sent information of the active stylus. If the active stylus leaves the touch screen for a period of time greater than a threshold in the stylus mode, the touch screen detects a finger signal and a signal of the active stylus in turn based on time slices, so as to determine the operating mode of the touch screen.

In the embodiment of the present invention, the touch screen controller codes the target operating frequency and generates a corresponding pulse signal, and then sends the corresponding pulse signal to the active stylus through the touch screen. The touch screen controller sends the corresponding pulse signal to the active stylus through the touch screen at an operating frequency other than the target operating frequency. The touch screen controller receives a driving signal and a communication coded signal that are sent by the active stylus after the active stylus is frequency-adjusted to the target operating frequency; and performs frame synchronization with the active stylus according to the driving signal and the communication coded signal, and acquires touch information of the active stylus.

In the foregoing example, when the touch mode of the user is the finger mode, the touch screen controller detects finger information in subsequent time slices. If the finger leaves the touch screen for a period of time greater than a threshold in the finger mode, the touch screen detects a finger signal and a signal of the active stylus in turn based on time slices, so as to determine the operating mode of the touch screen.

In the foregoing example, when the touch mode of the user is the hybrid mode (a palm of the user is in contact with the touch screen and a touch operation is performed with the active stylus), the touch screen controller performs finger scanning in an Nth time slice, and in an (N+1)th time slice, sends the target operating frequency and detects a state of the active stylus to generate the stylus touch signal. That is, the touch screen controller controls a first area of the touch screen to send the pulse signal, and controls a second area of the touch screen to send a reverse-phase pulse signal that has the same frequency as but an opposite phase to the pulse signal. The first area is an upper half screen of the touch screen, and the second area is a lower half screen of the touch screen, and the second area is an area, of the touch screen, in contact with the palm of the user, and the first area is an area not in contact with the palm of the user.

In the method according to the embodiment of the present invention, the touch screen in contact with the active stylus and in contact with the palm detects touch information of the palm and touch information of the active stylus with pulse signals that have the same frequency but opposite phases in the hybrid mode, so that the signals received by the stylus are enhanced.

Figure 7:
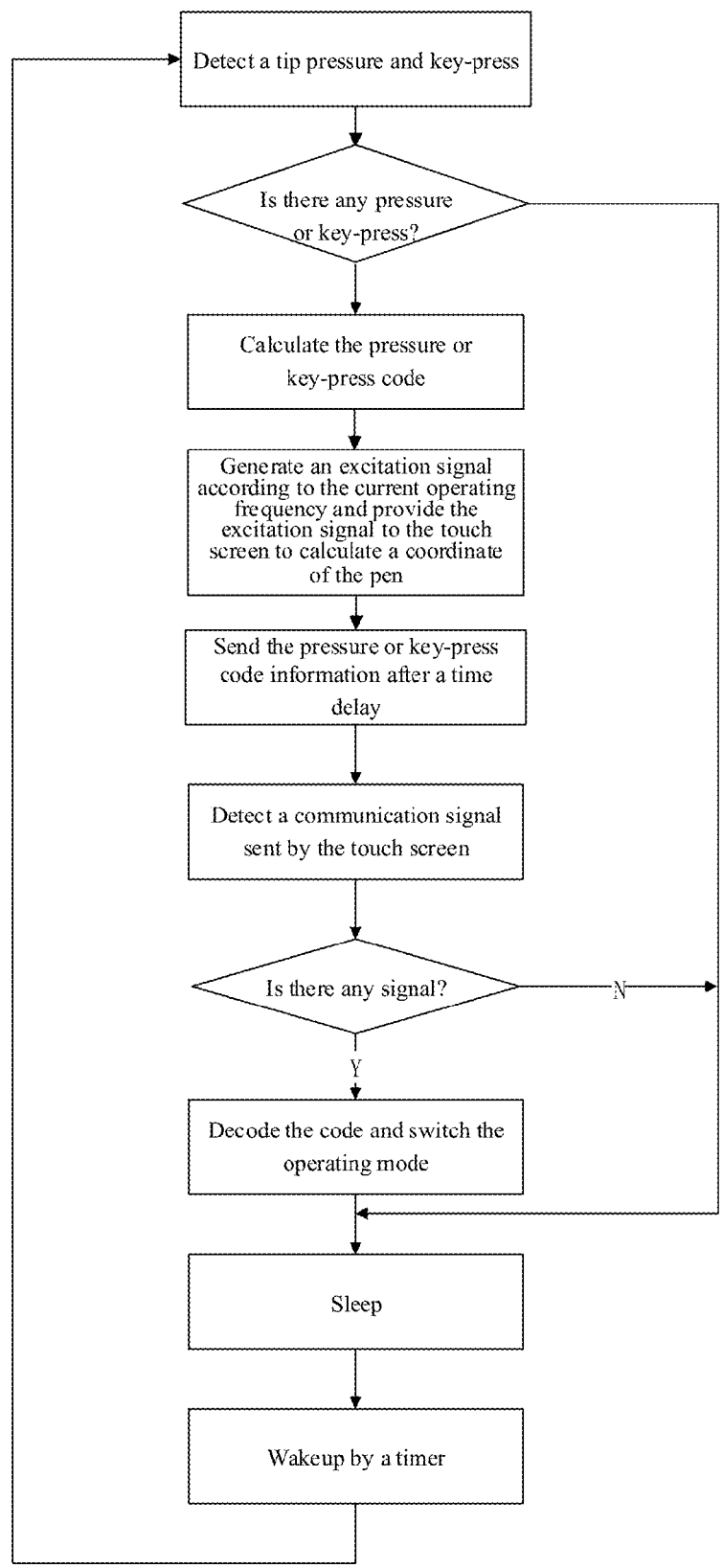
FIG. 7 is an operational flow chart of the active stylus according to an embodiment of the present invention.

FIG. 7 is an operational flow chart of the active stylus according to an embodiment of the present invention. As shown in FIG. 7, first, the active stylus detects whether there is any pressure or key-press, and if it is detected that there is no pressure or key-press operation, the active stylus enters a sleep state until the next cycle arrives and the active stylus is woken up for repeated execution. When it is detected that there is pressure or key-press, an excitation signal is generated. After the excitation signal is sent, the active stylus waits for a period of time (this period of time is left for the touch terminal to perform synchronization with the active stylus) before sending pressure or key-press coded information. After sending the coded information, the active stylus detects whether there is a communication signal initiated by the touch terminal, if yes, the active stylus continues to decode the communication signal, and switch its own operating frequency, and if not, the active stylus enters a sleep process and waits for arrival of the next cycle.

In the embodiment of the present invention, the active stylus acquires the target operating frequency according to the number of pulses. It is assumed that an operating frequency range of the touch screen is 100-800 KHz, and an operating frequency range of the active stylus is 400-700 KHz. LCD interference exists on some frequencies. If the touch screen operates at these frequencies, the touch screen is subjected to LCD interference. The touch screen controller detects interference intensity, i.e., noise information, of the active stylus on various frequencies of the touch screen, and selects an optimum frequency in the range of 100-800 KHz to serve as an operating frequency for detecting finger touch. Besides, according to the interference intensity, i.e., the noise information, of the active stylus on various frequencies of the touch screen, an optimum target operating frequency is selected in the range of 400-700 KHz to serve as an operating frequency for data interaction between the active stylus and the touch screen. For example, the operating frequencies of the active stylus are 12 fixed frequency points in the range of 400-700 KHz and are respectively indicated by f1-f12. The touch screen controller may perform a frequency scanning operation on 100-800 KHz (including the aforementioned 12 fixed frequency points of f1-f12) to determine the target operating frequency of the active stylus. Codes corresponding to f1-f12 are separately shown in Table 1:

TABLE 1

| |
| --- |
| 111111 representing operating frequency f1 of the active stylus |
| 111110 representing operating frequency f2 of the active stylus |
| 111100 representing operating frequency f3 of the active stylus |
| 111000 representing operating frequency f4 of the active stylus |
| 110000 representing operating frequency f5 of the active stylus |
| 100000 representing operating frequency f6 of the active stylus |
| 111010 representing operating frequency f7 of the active stylus |
| 110100 representing operating frequency f8 of the active stylus |
| 101000 representing operating frequency f9 of the active stylus |
| 110010 representing operating frequency f10 of the active stylus |
| 101010 representing operating frequency f11 of the active stylus |
| 100100 representing operating frequency f12 of the active stylus |

Figure 8:
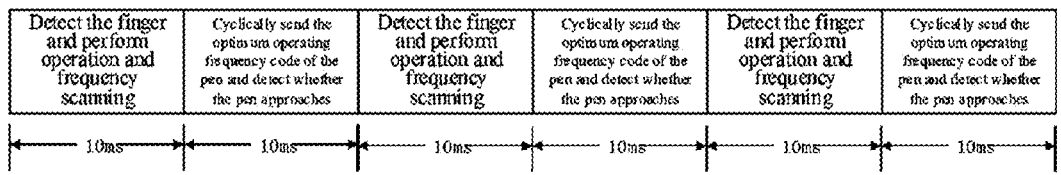
FIG. 8 is a schematic diagram of a detection time sequence according to an embodiment of the present invention.

FIG. 8 is a schematic diagram of a detection time sequence according to an embodiment of the present invention. As shown in FIG. 8, it is assumed that in the frequency scanning process of FIG. 8, the touch screen detects that two frequencies, among f1-f12, with minimum LCD interference are fn and fm (n and m are less than 13), in which frequency fn is the point with minimum noise, i.e., the target operating frequency of the active stylus. When n=3, the process "cyclically send the optimum operating frequency code and detect whether the active stylus approaches" shown in FIG. 8 is as follows.

1. A driving circuit generates a signal with frequency fm, and cyclically generates a coding sequence of f3 according to the aforementioned rules "the touch screen performs communication coding with 0 and 1 on the active stylus".

2. A demodulation circuit detects whether a signal with frequency f3 exists on the screen at the same time of the foregoing processing 1.

3. Loop continuously according to the sequence of FIG. 8 until existence of an f3 signal is detected, enter a stylus mode, and perform frame synchronization to calculate time and receive a communication code.

Figure 9:
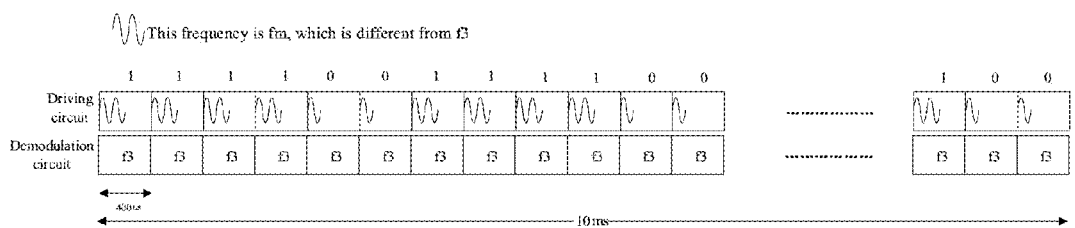
FIG. 9 is a simulation diagram of generation of a coding sequence and detection according to an embodiment of the present invention.
Figure 10:
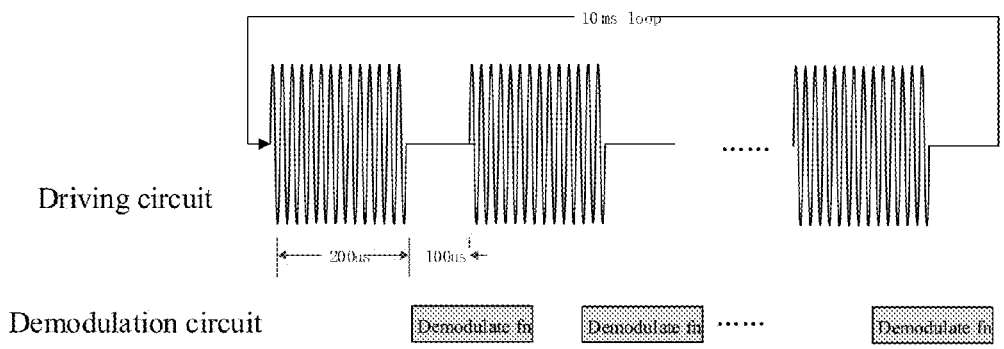
FIG. 10 is a schematic diagram of cyclic sending of an optimum operating frequency and detection of whether the stylus approaches according to an embodiment of the present invention.

The foregoing process may be shown in FIG. 9.

In an embodiment of the present invention, due to a fine tip (with a diameter of about 1 mm) of the active stylus, the coupling capacitance between the tip and the touch screen is extremely small, which is about 0.05 pf. Therefore, when driving channels of the touch screen send coded signals, multiple driving circuits (i.e., a certain area) usually generate signals with the same frequency and phase so as to enhance the strength of signals received by the tip. Besides, when the touch screen controller controls the demodulation circuit to detect a target signal with a frequency of fn, multiple driving channels generate signals with the same frequency and phase as fn, which easily causes saturation of the detection circuit and failure of detection of a touch signal at fn. Hence, one half of the driving channels generate signals with the same frequency and phase, and the other half of the driving channels generate signals with the same frequency but a phase difference of 180 degrees (i.e., reverse-phase signals with the same frequency but an opposite phase). Therefore, the interference with a touch signal at fm is zero, so that the demodulation circuit can detect a touch signal of the active stylus at frequency fn.

In an embodiment of the present invention, the problem of failing to detect a signal of the active stylus does not occur when the palm is not in contact with the touch screen. However, when the user holds the active stylus with the hand placed on the surface of the touch screen, and then performs an operation with the active stylus, if signals generated through touches of the tip and the palm on the screen have the same phase, the signals of the touch screen are coupled to the detection circuit of the active stylus through the tip and are coupled to a housing (i.e., a GND of a stylus subsystem) of the active stylus through the palm, so that a signal on the tip is a common-mode signal with respect to a signal on the GND, and the strength of signals detected by the detection circuit is greatly impaired. If it is found that there is no palm contact, an upper half screen and a lower half screen send signals with opposite polarities; if it is found that there is palm contact, the palm area and the area beyond the palm send signals with opposite polarities, so as to strengthen signals coupled to the tip.

The active stylus performs decoding after receiving the communication signal sent by the touch screen so as to obtain target operating frequency fn. The operating frequency is switched to target operating frequency fn in the next 10 ms, and a driving signal and a communication coded signal are generated at target operating frequency fn. After the touch screen receives the driving signal and the communication coded signal that are sent by the active stylus at target operating frequency fn, it is confirmed that the active stylus has received the coded signal sent by the touch screen, and the touch screen enters the stylus mode. Next, frame synchronization is performed to calculate time according to the driving signal transmitted by the active stylus, and bit synchronization is performed according to a preamble code of the communication coded signal transmitted by the active stylus, so as to implement communication from the active stylus to the touch screen.

Figure 11:
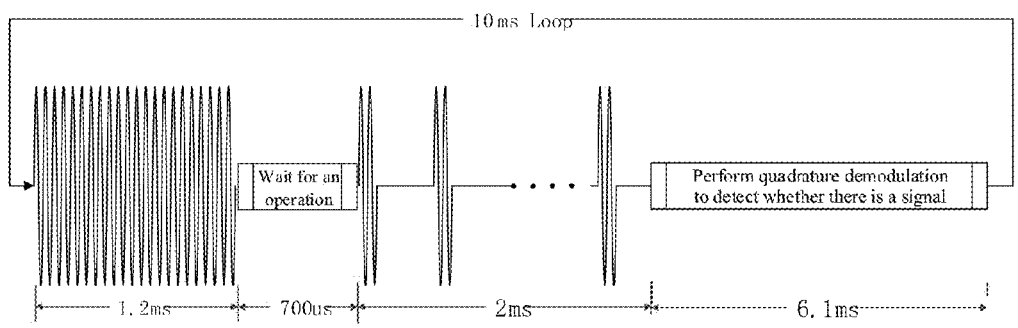
FIG. 11 is a schematic processing diagram of quadrature demodulation to detect whether there is a signal according to an embodiment of the present invention.

The demodulation process of the active stylus is that: whether there is a signal of fn is detected based on a cycle of 400 us in a time period "perform quadrature demodulation to detect whether there is a signal" shown in FIG. 11, if no signal is detected in the first 400 us, it indicates that frequency hopping is not required in the current state, and if a signal is detected in the first 400 us, a signal of fn is generated for 400 us immediately through a transmission circuit, and fn is used as the operating frequency from the next cycle.

In an embodiment of the present invention, due to a fine tip (with a diameter of about 1 mm) of the active stylus, the coupling capacitance between the tip and the touch screen is extremely small, which is about 0.05 pf. Therefore, when driving channels of the touch screen send coded signals, multiple driving circuits (i.e., a certain area) usually generate signals with the same frequency and phase so as to enhance the strength of signals received by the tip.

When the user holds the active stylus with the hand placed on the surface of the touch screen, and then performs an operation with the active stylus, if signals generated through touches of the tip and the palm on the screen have the same phase, the signals of the touch screen are coupled to the detection circuit of the active stylus through the tip and are coupled to the housing (i.e., the GND of the stylus subsystem) of the active stylus through the palm, so that a signal on the tip is a common-mode signal with respect to a signal on the GND, and the strength of signals detected by the detection circuit is greatly impaired. Therefore, in the present invention, through the finger detection process in FIG. 8, if it is found that there is no palm contact, an upper half screen and a lower half screen send signals with opposite polarities; if it is found that there is palm contact, the palm area and the area beyond the palm send signals with opposite polarities, so as to strengthen signals coupled to the tip.

The active stylus performs decoding after receiving the communication signal sent by the touch screen so as to obtain target operating frequency fn. The operating frequency is switched to target operating frequency fn in the next 10 ms, and a driving signal and a communication coded signal are generated at target operating frequency fn. After the touch screen receives the driving signal and the communication coded signal that are sent by the active stylus at target operating frequency fn, the touch screen enters the stylus mode.

In the detection method according to the embodiment of the present invention, the touch screen controller scans noise information on multiple operating frequencies of the active stylus, so as to determine a target operating frequency of the active stylus, so that the active stylus operates at the target operating frequency. In this way, use by a user is facilitated, the efficiency of communication between the active stylus and a touch screen terminal is improved, and active styluses with different frequencies are all applicable to the touch screen.

Figure 12:
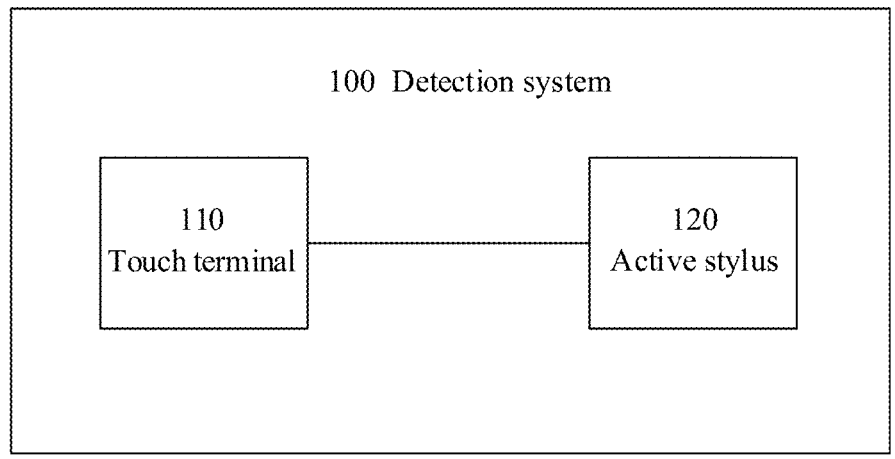
FIG. 12 is a structural block diagram of a detection system according to an embodiment of the present invention.

FIG. 12 is a structural block diagram of a detection system according to an embodiment of the present invention. As shown in FIG. 12, the detection system 100 according to the embodiment of the present invention includes: a touch terminal 110 and an active stylus 120.

The touch terminal 110 is configured to separately scan multiple pieces of noise information on multiple operating frequencies of an active stylus of a touch screen, and determine a target operating frequency according to the multiple pieces of noise information, in which the touch screen acquires the target operating frequency according to the number of pulses.

The active stylus 120 is configured to receive the target operating frequency sent by the touch terminal, and adjust an operating frequency of the active stylus to the target operating frequency, so that the active stylus and the touch terminal operate jointly at the target operating frequency, in which the active stylus acquires the target operating frequency by means of quadrature demodulation.

In the detection system according to the embodiment of the present invention, the touch screen controller scans noise information on multiple operating frequencies of the active stylus, so as to determine a target operating frequency of the active stylus, so that the active stylus operates at the target operating frequency. In this way, use by a user is facilitated, the efficiency of communication between the active stylus and a touch screen terminal is improved, and active styluses with different frequencies are all applicable to the touch screen.

The detection system of the present invention is described in detail below with reference to the drawings.

The touch terminal 110 is further configured to receive a driving signal and a communication coded signal that are sent by the active stylus after the active stylus is adjusted to the target operating frequency, and perform frame synchronization with the active stylus according to the driving signal and the communication coded signal, so as to acquire touch information of the active stylus. An operating mode of the touch terminal 110 includes a finger mode, a stylus mode, and a hybrid mode, the touch terminal includes a touch screen controller, and the touch screen controller controls, according to a detected finger touch signal or stylus touch signal, the operating mode of the touch screen to switch between the finger mode, the stylus mode, and the hybrid mode.

As shown in FIG. 6, when a current operation mode (a finger operation or an active stylus operation) is not determined, a finger signal and a stylus touch signal of the active stylus are detected in turn based on time slices, so as to determine a touch mode of the user. When the touch mode of the user is the stylus mode, the touch screen controller detects an excitation signal and a coded signal of the active stylus in subsequent time slices, and performs frame synchronization in time sequence with the active stylus so as to decode touch information and sent information of the active stylus. If the active stylus leaves the touch screen for a period of time greater than a threshold in the stylus mode, the touch screen detects a finger signal and a signal of the active stylus in turn based on time slices, so as to determine the operating mode of the touch screen.

In the embodiment of the present invention, the touch screen controller codes the target operating frequency and generates a corresponding pulse signal, and then sends the corresponding pulse signal to the active stylus through the touch screen. The touch screen controller sends the corresponding pulse signal to the active stylus through the touch screen at an operating frequency other than the target operating frequency. The touch screen controller receives a driving signal and a communication coded signal that are sent by the active stylus after the active stylus is frequency-adjusted to the target operating frequency; and performs frame synchronization with the active stylus according to the driving signal and the communication coded signal, and acquires touch information of the active stylus.

In the embodiment of the present invention, when the touch mode of the user is the finger mode, the touch screen controller detects finger information in subsequent time slices. If the finger leaves the touch screen for a period of time greater than a threshold in the finger mode, the touch screen detects a finger signal and a signal of the active stylus in turn based on time slices, so as to determine the operating mode of the touch screen.

In the embodiment of the present invention, when the touch mode of the user is the hybrid mode (the palm of the user is in contact with the touch screen and a touch operation is performed with the active stylus), the touch screen controller performs finger scanning in an Nth time slice, and in an (N+1)th time slice, sends the target operating frequency and detects a state of the active stylus to generate the stylus touch signal. That is, the touch screen controller controls a first area of the touch screen to send the pulse signal, and controls a second area of the touch screen to send a reverse-phase pulse signal that has the same frequency as but an opposite phase to the pulse signal. The first area is an upper half screen of the touch screen, and the second area is a lower half screen of the touch screen, and the second area is an area, of the touch screen, in contact with the palm of the user, and the first area is an area not in contact with the palm of the user.

In an embodiment of the present invention, due to a fine tip (with a diameter of about 1 mm) of the active stylus, the coupling capacitance between the tip and the touch screen is extremely small, which is about 0.05 pf. Therefore, when driving channels of the touch screen send coded signals, multiple driving circuits (i.e., a certain area) usually generate signals with the same frequency and phase so as to enhance the strength of signals received by the tip. Besides, when the touch screen controller controls the demodulation circuit to detect a target signal with a frequency of fn, multiple driving channels generate fm signals with the same frequency and phase, which easily causes saturation of the detection circuit and failure of detection of an fn signal. Hence, one half of the driving channels generate signals with the same frequency and phase, and the other half of the driving channels generate signals with the same frequency but a phase difference of 180 degrees (i.e., reverse-phase signals with the same frequency but an opposite phase). Therefore, the interference with an fm signal is zero, so that the demodulation circuit can detect an fn signal.

In an embodiment of the present invention, the problem of failing to detect a signal of the active stylus does not occur when the palm is not in contact with the touch screen. However, when the user holds the active stylus with the hand placed on the surface of the touch screen, and then performs an operation with the active stylus, if signals generated through touches of the tip and the palm on the screen have the same phase, the signals of the touch screen are coupled to the detection circuit of the active stylus through the tip and are coupled to the housing (i.e., the GND of the stylus subsystem) of the active stylus through the palm, so that a signal on the tip is a common-mode signal with respect to a signal on the GND, and the strength of signals detected by the detection circuit is greatly impaired. If it is found that there is no palm contact, an upper half screen and a lower half screen send signals with opposite polarities; if it is found that there is palm contact, the palm area and the area beyond the palm send signals with opposite polarities, so as to strengthen signals coupled to the tip.

The active stylus performs decoding after receiving the communication signal sent by the touch screen so as to obtain target operating frequency fn. The operating frequency is switched to target operating frequency fn in the next 10 ms, and a driving signal and a communication coded signal are generated at target operating frequency fn. After the touch screen receives the driving signal and the communication coded signal that are sent by the active stylus at target operating frequency fn, it is confirmed that the active stylus has received the coded signal sent by the touch screen, and the touch screen enters the stylus mode. Next, frame synchronization is performed to calculate time according to the driving signal transmitted by the active stylus, and bit synchronization is performed according to a preamble code of the communication coded signal transmitted by the active stylus, so as to implement communication from the active stylus to the touch screen.

In the detection system according to the embodiment of the present invention, the touch screen controller scans noise information on multiple operating frequencies of the active stylus, so as to determine a target operating frequency of the active stylus, so that the active stylus operates at the target operating frequency. In this way, use by a user is facilitated, the efficiency of communication between the active stylus and a touch screen terminal is improved, and active styluses with different frequencies are all applicable to the touch screen.

Figure 13:
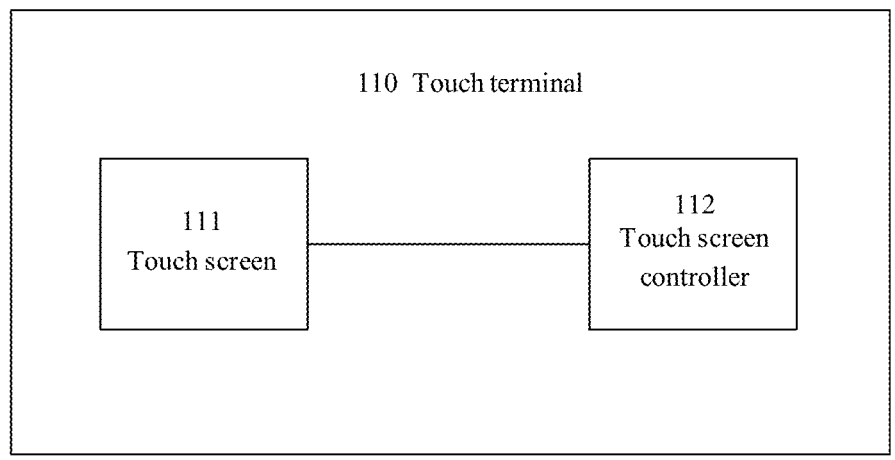
FIG. 13 is a structural block diagram of a touch terminal according to an embodiment of the present invention.

FIG. 13 is a structural block diagram of a touch terminal according to an embodiment of the present invention. As shown in FIG. 13, the touch terminal 110 according to an embodiment of the present invention includes: a touch screen 111 and a touch screen controller 112.

The touch screen 111 is configured to detect touch information of a user.

The touch screen controller 112 is configured to scan multiple pieces of noise information on multiple operating frequencies of an active stylus of the touch screen, so as to determine a target operating frequency, and send the target operating frequency to the active stylus.

Specifically, the touch screen controller is further configured to receive a driving signal and a communication coded signal that are sent by the active stylus after the active stylus is adjusted to the target frequency, so as to acquire touch information of the active stylus. An operating mode of the touch screen includes a finger mode, a stylus mode, and a hybrid mode, and the touch screen controller controls, according to a detected finger touch signal or stylus touch signal, the operating mode of the touch screen to switch between the finger mode, the stylus mode, and the hybrid mode. When the operating mode of the touch screen is the finger mode, the touch screen controller performs finger scanning in subsequent time slices. When the operating mode of the touch screen is the stylus mode, the touch screen controller detects an excitation signal and a coded signal of the active stylus in subsequent time slices. When the operating mode of the touch screen is the hybrid mode, the touch screen controller performs finger scanning in an Nth time slice, and in an (N+1)th time slice, sends the target operating frequency and detects a state of the active stylus to generate the stylus touch signal.

In an embodiment of the present invention, the touch screen controller is further configured to control a first area of the touch screen to send the pulse signal, and control a second area of the touch screen to send a reverse-phase pulse signal that has the same frequency as but an opposite phase to the pulse signal. The first area is an upper half screen of the touch screen, and the second area is a lower half screen of the touch screen. The second area is an area, of the touch screen, in contact with a palm of the user, and the first area is an area not in contact with the palm of the user.

The touch terminal 110 of the present invention is described in detail below.

In an embodiment of the present invention, when the touch terminal 110 does not determine a current touch mode of a user, the touch screen controller 112 detects in turn a finger signal and a touch signal of the active stylus on the touch screen 111 based on time slices, so as to determine the touch mode of the user. When the touch mode of the user is the stylus mode, the touch screen controller detects an excitation signal and a coded signal of the active stylus in subsequent time slices, and performs frame synchronization in time sequence with the active stylus so as to decode touch information and sent information of the active stylus. If the active stylus leaves the touch screen for a period of time greater than a threshold in the stylus mode, the touch screen controller 112 detects a finger signal and a signal of the active stylus in turn based on time slices, so as to determine the operating mode of the touch screen.

In the embodiment of the present invention, the touch screen controller codes the target operating frequency and generates a corresponding pulse signal, and then sends the corresponding pulse signal to the active stylus through the touch screen. The touch screen controller sends the corresponding pulse signal to the active stylus through the touch screen at an operating frequency other than the target operating frequency. The touch screen controller receives a driving signal and a communication coded signal that are sent by the active stylus after the active stylus is frequency-adjusted to the target operating frequency; and performs frame synchronization with the active stylus according to the driving signal and the communication coded signal, and acquires touch information of the active stylus.

In the embodiment of the present invention, when the touch mode of the user is the finger mode, the touch screen controller detects finger information in subsequent time slices. If the finger leaves the touch screen for a period of time greater than a threshold in the finger mode, the touch screen controller detects a finger signal and a signal of the active stylus in turn based on time slices, so as to determine the operating mode of the touch screen.

In the embodiment of the present invention, when the touch mode of the user is the hybrid mode (the palm of the user is in contact with the touch screen and a touch operation is performed with the active stylus), the touch screen controller performs finger scanning in an Nth time slice, and in an (N+1)th time slice, sends the target operating frequency and detects a state of the active stylus to generate the stylus touch signal. That is, the touch screen controller controls a first area of the touch screen to send the pulse signal, and controls a second area of the touch screen to send a reverse-phase pulse signal that has the same frequency as but an opposite phase to the pulse signal. The first area is an upper half screen of the touch screen, and the second area is a lower half screen of the touch screen, and the second area is an area, of the touch screen, in contact with the palm of the user, and the first area is an area not in contact with the palm of the user.

When both the palm and the active stylus are in contact with the touch screen, the palm will couple signal from the touch screen, the signal will be transferred to the shell of the active stylus, and this signal will cancel the useful signal of the stylus received. Therefore, when it is found that the palm is in contact with the touch screen, the palm area and the area beyond the palm send signals with opposite polarities, so as to strength signals coupled between the tip of the active stylus and the touch screen. When only the finger or only the active stylus is in contact with the touch screen, the upper half screen and the lower half screen send signals with the same polarity.

Figure 14:
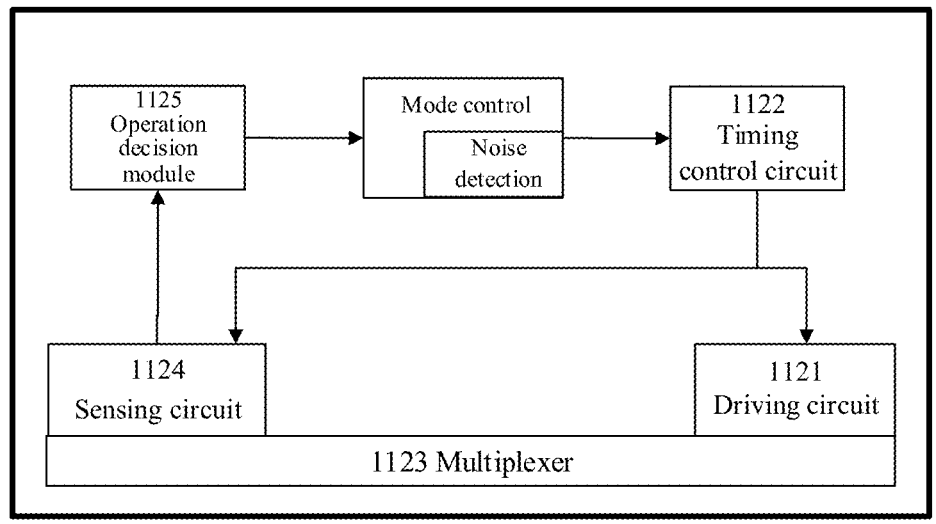
FIG. 14 is a structural block diagram of a touch screen controller according to an embodiment of the present invention.
Figure 15:
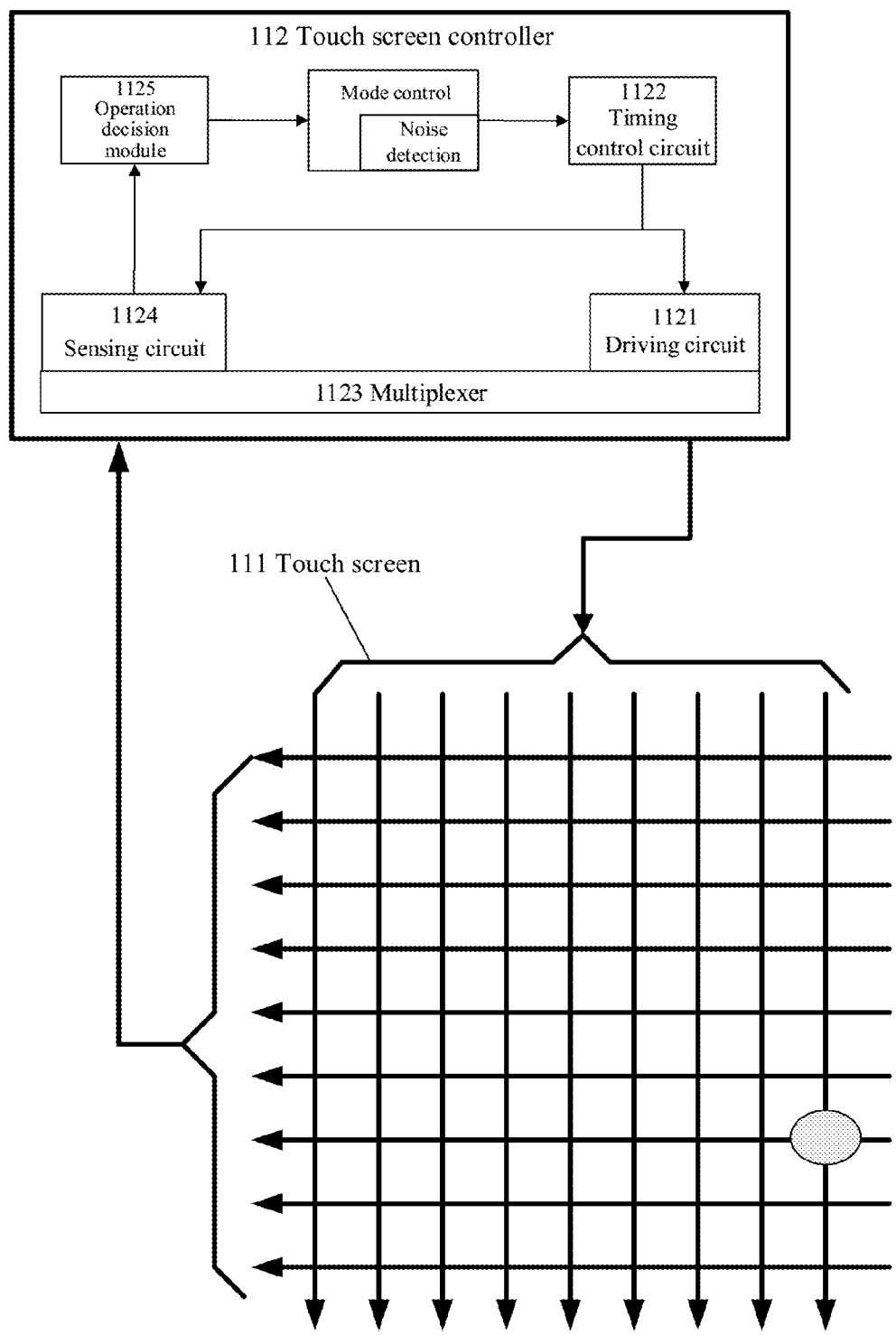
FIG. 15 is a schematic structural view of the touch screen controller according to an embodiment of the present invention.

FIG. 14 is a structural block diagram of a touch screen controller according to an embodiment of the present invention. FIG. 15 is a schematic structural view of the touch screen controller according to an embodiment of the present invention. As shown in FIG. 14 and FIG. 15, the touch screen controller 112 according to an embodiment of the present invention includes: a driving circuit 1121, a timing control circuit 1122, a multiplexer 1123, a sensing circuit 1124, and an operation decision module 1125.

The sensing circuit 1124 is configured to receive touch information detected by the touch screen.

The operation decision module 1125 is configured to identify a touch mode of the user according to the touch signal so as to switch the operating mode of the touch screen.

The timing control circuit 1122 is configured to control the driving circuit 1121 and the multiplexer 1123 to generate a timing signal on the touch screen so as to control the touch screen 111.

In the touch terminal according to the embodiment of the present invention, the touch screen controller scans noise information on multiple operating frequencies of the active stylus, so as to determine a target operating frequency of the active stylus, so that the active stylus operates at the target operating frequency. In this way, use by a user is facilitated, the efficiency of communication between the active stylus and a touch screen terminal is improved, and active styluses with different frequencies are all applicable to the touch screen.

Figure 16:
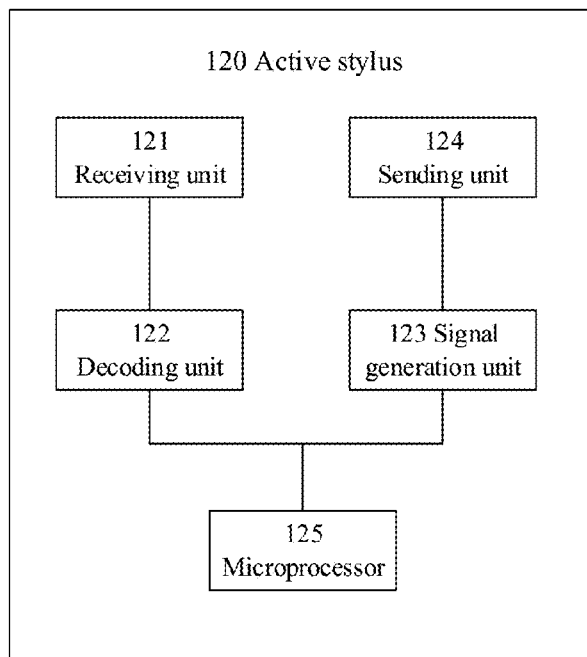
FIG. 16 is a structural block diagram of an active stylus according to an embodiment of the present invention.
Figure 17:
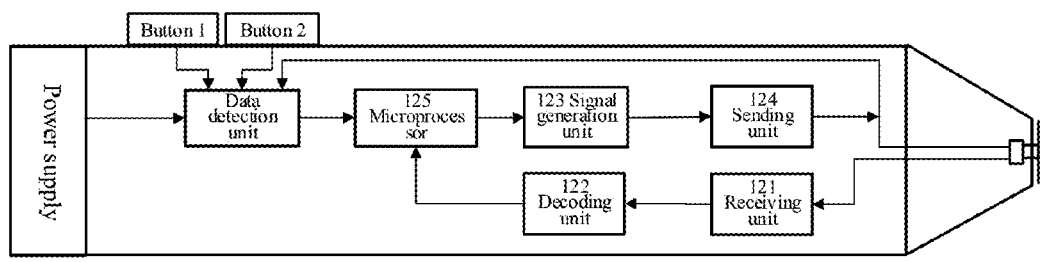
FIG. 17 is a schematic structural view of the active stylus according to an embodiment of the present invention.

FIG. 16 is a structural block diagram of an active stylus according to an embodiment of the present invention. FIG. 17 is a schematic structural view of the active stylus according to an embodiment of the present invention. As shown in FIG. 16 and FIG. 17, the active stylus 120 according to an embodiment of the present invention includes: a receiving unit 121, a decoding unit 122, a signal generation unit 123, a sending unit 124, and a microprocessor 125.

The receiving unit 121 is configured to receive a communication signal sent by a capacitive touch screen.

The decoding unit 122 is configured to decode the communication signal so as to obtain a target operating frequency of the active stylus.

The signal generation unit 123 is configured to generate a communication coded signal and an excitation signal.

The sending unit 124 is configured to send the communication coded signal and the driving signal to a touch terminal.

The microprocessor 125 is configured to control, according to the target operating frequency, the signal generation unit to generate the communication coded signal and the excitation signal.

Specifically, the microprocessor 125 controls the sending unit 124 to send multiple operating frequencies of the active stylus to the touch terminal, in which the touch terminal performs detection and processing and sends a communication signal to the active stylus. The communication signal is received by the receiving unit 121, and the communication signal is decoded by the decoding unit 122 to obtain a target operating frequency of the active stylus. The microprocessor 125 may control the active stylus 120 to adjust an operating frequency to the target operating frequency, and control the signal generation unit 123 to generate a communication coded signal and an excitation signal. After the active stylus 120 establishes frame synchronization with the touch terminal 110, the sending unit 124 is configured to send a touch signal to the touch terminal 110.

Figure 18:
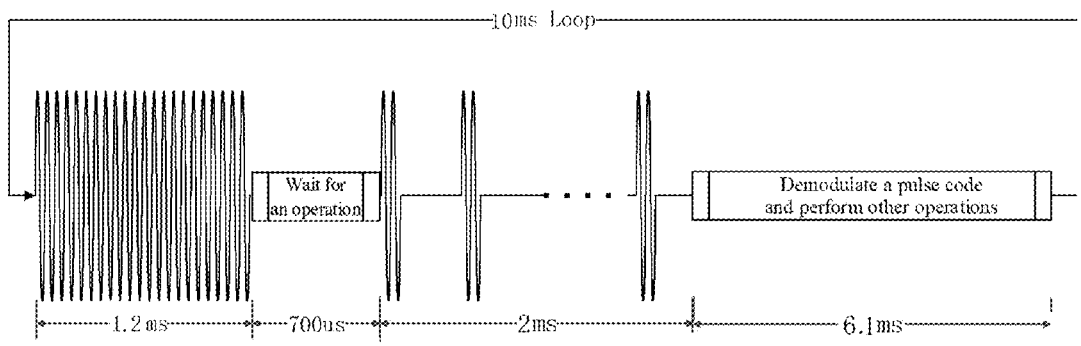
FIG. 18 is a schematic operational diagram of the active stylus according to an embodiment of the present invention.

FIG. 18 is a schematic operational diagram of the active stylus according to an embodiment of the present invention. As shown in FIG. 18, in a time period of 1.2 ms, the signal generation unit 123 generates a driving signal and the driving signal is sent by the sending unit 124 to the touch terminal 110. In a time period of 700 us, processing of the touch terminal is waited for. In a time period of 2 ms, the active stylus 120 sends coded information to the touch terminal 110 through the sending unit 124, the amount of the coded information is 10 bits, each bit of coded information is transmitted for 200 us, and the first bit is used as a preamble code and is constantly 1. In a time period of 6.1 ms, the decoding unit 122 decodes the communication signal sent by the touch terminal 110 and communicates with the touch terminal 110 according to the target operating frequency obtained by decoding.

In the active stylus according to the embodiment of the present invention, a target operating frequency of the active stylus is obtained from the touch terminal, and data and touch information are sent to the touch terminal at the target operating frequency. In this way, the efficiency of communication between the active stylus and the touch terminal is improved, and it is unnecessary to manually adjust an operating frequency of the active stylus, so that use by a user is facilitated.

Figure 19:
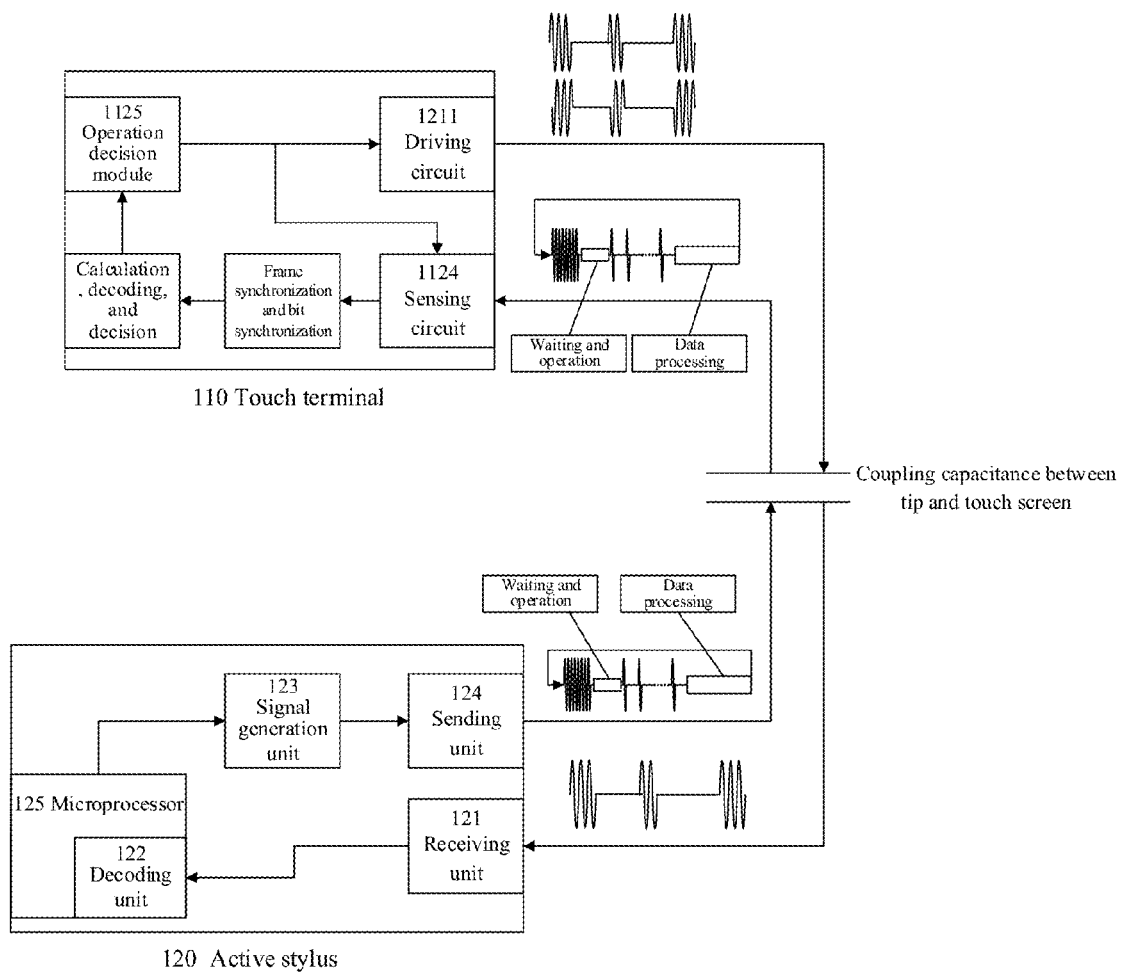
FIG. 19 is a schematic diagram of communication between the touch terminal and the active stylus according to an embodiment of the present invention.

FIG. 19 is a schematic diagram of communication between the touch terminal and the active stylus according to an embodiment of the present invention. As shown in FIG. 19, the microprocessor 125 controls the sending unit 124 to send multiple operating frequencies of the active stylus to the touch terminal, and after the sensing circuit 1124 receives the multiple operating frequencies of the active stylus, the operation decision module 1125 performs frame synchronization and bit synchronization to detect noise information of the touch terminal at the multiple operating frequencies, so as to determine an optimum target operating frequency of the active stylus. The target operating frequency is coded, and coded data is sent to the receiving unit 121 through the driving circuit 1211. The decoding unit 122 decodes the coded data to obtain the target operating frequency. The microprocessor 125 controls the active stylus to operate at the target operating frequency, and meanwhile controls the signal generation unit 123 to generate a communication coded signal and an excitation signal. The touch terminal performs data interaction with the active stylus according to the excitation signal and the coded signal.

Figure 20:
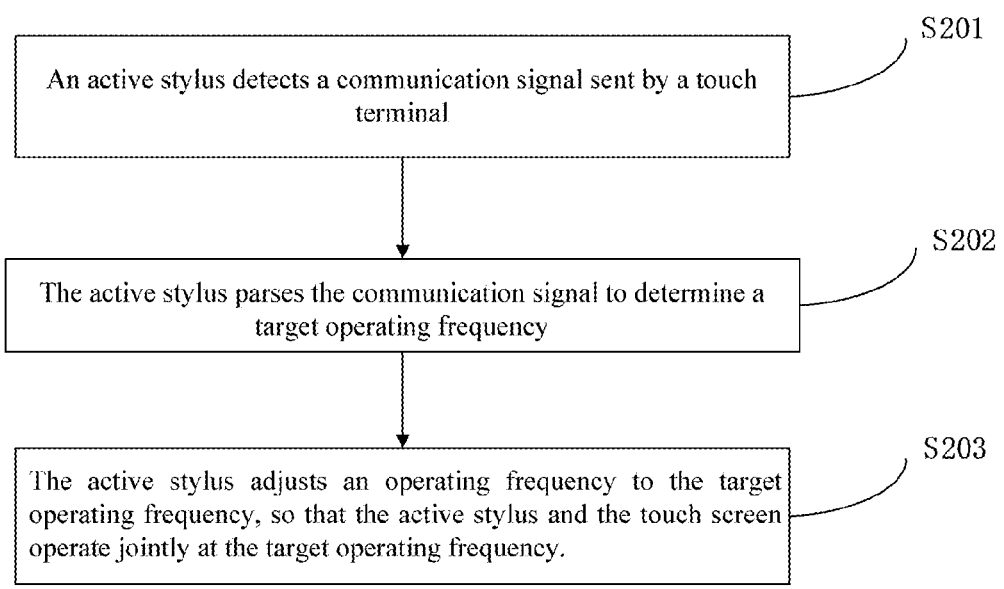
FIG. 20 is a flow chart of a detection method according to another embodiment of the present invention.

FIG. 20 is a flow chart of a detection method according to another embodiment of the present invention. As shown in FIG. 20, the detection method according to the embodiment of the present invention includes the following steps.

Step 201: An active stylus detects a communication signal sent by a touch terminal.

Specifically, multiple operating frequencies of the active stylus are sent to the touch terminal, so that the touch terminal determines the target operating frequency, codes the target operating frequency and sends the obtained communication signal to the active stylus.

Step 202: The active stylus parses the communication signal to determine a target operating frequency Step 203: The active stylus adjusts an operating frequency to the target operating frequency, so that the active stylus and the touch screen operate jointly at the target operating frequency.

Specifically, the active stylus establishes frame synchronization with the touch terminal according to the target operating frequency, so that the active stylus and the touch screen operate jointly at the target operating frequency. The active stylus operates at the target operating frequency and establishes synchronization with the touch terminal to perform data interaction.

In an embodiment of the present invention, the touch terminal separately scans multiple pieces of noise information on multiple operating frequencies of the active stylus, so as to determine an optimum target operating frequency of the active stylus. The touch terminal performs processing such as coding on the target operating frequency and sends the processed target operating frequency to the active stylus. The active stylus acquires coded information containing the target operating frequency according to the number of pulses and decodes the coded information to obtain the target operating frequency. After the active stylus obtains the target operating frequency, the active stylus adjusts its operating frequency to the target operating frequency and sends an excitation signal and a coded signal to the touch terminal. The active stylus establishes frame synchronization with the touch terminal according to the coded signal, so that the touch terminal receives touch information of the active stylus to implement communication.

In the detection method according to the embodiment of the present invention, a target operating frequency of an active stylus is obtained from a touch terminal, and data and touch information are sent to the touch terminal at the target operating frequency. In this way, the efficiency of communication between the active stylus and the touch terminal is improved, and it is unnecessary to manually adjust an operating frequency of the active stylus, so that use by a user is facilitated.

Although the embodiments of the present invention have been illustrated and described in the foregoing text, it should be understood that the foregoing embodiments are exemplary and shall not be construed to limit the present invention. A person of ordinary skill in the art can make changes, modifications, replacements and variations to the foregoing embodiments within the scope of the present invention without departing from the principle and purpose of the present invention.

INDUSTRIAL APPLICABILITY

In the touch terminal, active stylus detection method, and system according to the embodiments of the present invention, a target operating frequency of an active stylus is obtained from a touch terminal, and data and touch information are sent to the touch terminal at the target operating frequency. In this way, the efficiency of communication between the active stylus and the touch terminal is improved, and it is unnecessary to manually adjust an operating frequency of the active stylus, so that use by a user is facilitated.

What is claimed is:

1. A detection method, comprising a following sequence of steps:
    separately scanning, by a touch screen controller, multiple pieces of noise information on multiple operating frequencies of an active stylus of a touch screen;
    determining, by the touch screen controller, a target operating frequency according to the multiple pieces of noise information;
    sending, by the touch screen controller, the target operating frequency to the active stylus;
    wherein the sending causes the active stylus and the touch screen to operate jointly at the target operating frequency when an operating frequency of the active stylus is adjusted to the target operating frequency;
    receiving, by the touch screen controller, a driving signal and a communication coded signal that are sent by the active stylus after the active stylus is frequency-adjusted to the target operating frequency; and
    performing, by the touch screen controller, frame synchronization with the active stylus according to the driving signal and the communication coded signal, and acquiring touch information of the active stylus.

2. The detection method according to claim 1, wherein an operating mode of the touch screen comprises a finger mode, a stylus mode, and a hybrid mode, and the touch screen controller controls, according to a detected finger touch signal or stylus touch signal, the operating mode of the touch screen to switch between the finger mode, the stylus mode, and the hybrid mode.

3. The detection method according to claim 2, wherein after the touch screen enters the finger mode, the method further comprises:
    performing, by the touch screen controller, finger scanning in subsequent time slices.

4. The detection method according to claim 2, wherein after the touch screen enters the stylus mode, the method further comprises:
    detecting, by the touch screen controller, an excitation signal and a coded signal of the active stylus in subsequent time slices.

5. The detection method according to claim 2, wherein after the touch screen enters the hybrid mode, the method further comprises:
    performing, by the touch screen controller, finger scanning in an Nth time slice, and in an (N+1)th time slice, sending the target operating frequency to the active stylus and detecting a state of the active stylus to generate the stylus touch signal.

6. The detection method according to claim 1, wherein the sending, by the touch screen controller, the target operating frequency to the active stylus specifically comprises:
    coding, by the touch screen controller, the target operating frequency and generating a corresponding pulse signal; and
    sending, by the touch screen controller, the corresponding pulse signal to the active stylus through the touch screen.

7. The detection method according to claim 6, wherein the sending, by the touch screen controller, the corresponding pulse signal to the active stylus through the touch screen specifically comprises:
    sending, by the touch screen controller, the corresponding pulse signal to the active stylus through the touch screen at an operating frequency other than the target operating frequency.

8. The detection method according to claim 6, wherein the coding, by the touch screen controller, the target operating frequency and generating the corresponding pulse signal specifically comprises:
    controlling, by the touch screen controller, a first area of the touch screen to send the pulse signal, and controlling a second area of the touch screen to send a reverse-phase pulse signal that has the same frequency as but an opposite phase to the pulse signal.

9. The detection method according to claim 8, wherein the first area is an upper half screen of the touch screen, and the second area is a lower half screen of the touch screen.

10. The detection method according to claim 8, wherein the second area is an area, of the touch screen, in contact with a palm of a user, and the first area is an area not in contact with the palm of the user.

11. The detection method according to claim 1, wherein the active stylus acquires the target operating frequency by means of quadrature demodulation.

12. A detection system, comprising:
    a touch terminal, configured to separately scan multiple pieces of noise information on multiple operating frequencies of an active stylus of a touch screen, and determine a target operating frequency according to the multiple pieces of noise information; and
    the active stylus, configured to receive the target operating frequency sent by the touch terminal, and adjust an operating frequency of the active stylus to the target operating frequency, so that the active stylus and the touch terminal operate jointly at the target operating frequency;
    the touch terminal is further configured to receive a driving signal and a communication coded signal that are sent by the active stylus after the active stylus is adjusted to the target operating frequency, and perform frame synchronization with the active stylus according to the driving signal and the communication coded signal, so as to acquire touch information of the active stylus.

13. The detection system according to claim 12, wherein an operating mode of the touch terminal comprises a finger mode, a stylus mode, and a hybrid mode, the touch terminal comprises a touch screen controller, and the touch screen controller controls, according to a detected finger touch signal or stylus touch signal, the operating mode of the touch screen to switch between the finger mode, the stylus mode, and the hybrid mode.

14. The detection system according to claim 13, wherein after the touch terminal enters the finger mode, the touch terminal performs finger scanning in subsequent time slices.

15. The detection system according to claim 13, wherein after the touch terminal enters the stylus mode, the touch terminal detects an excitation signal and a coded signal of the active stylus in subsequent time slices.

16. The detection system according to claim 13, wherein after the touch terminal enters the hybrid mode, the touch terminal performs finger scanning in an Nth time slice, and in an (N+1)th time slice, sends the target operating frequency to the active stylus and detects a state of the active stylus to generate the stylus touch signal.

17. The detection system according to claim 12, wherein the touch screen controller codes the target operating frequency and generates a corresponding pulse signal, and sends the corresponding pulse signal to the active stylus.

18. The detection system according to claim 17, wherein the touch screen controller sends the corresponding pulse signal to the active stylus at an operating frequency other than the target operating frequency.

19. The detection system according to claim 17, wherein the touch screen controller is further configured to control a first area of the touch screen to send the pulse signal, and control a second area of the touch screen to send a reverse-phase pulse signal that has the same frequency as but an opposite phase to the pulse signal.

20. The detection system according to claim 19, wherein the first area is an upper half screen of the touch screen, and the second area is a lower half screen of the touch screen.

21. The detection system according to claim 19, wherein the second area is an area, of the touch screen, in contact with a palm of a user, and the first area is an area not in contact with the palm of the user.

22. The detection system according to claim 12, wherein the active stylus acquires the target operating frequency by means of quadrature demodulation.

23. A touch terminal, comprising:
a touch screen, configured to detect touch information of a user; and
a touch screen controller, configured to scan multiple pieces of noise information on multiple operating frequencies of an active stylus of the touch screen, so as to determine a target operating frequency, and send the target operating frequency to the active stylus;
the touch screen controller is further configured to receive a driving signal and a communication coded signal that are sent by the active stylus after the active stylus is adjusted to the target frequency, and perform frame synchronization with the active stylus according to the driving signal and the communication coded signal, so as to acquire touch information of the active stylus.

24. The touch terminal according to claim 23, wherein an operating mode of the touch screen comprises a finger mode, a stylus mode, and a hybrid mode, and the touch screen controller controls, according to a detected finger touch signal or stylus touch signal, the operating mode of the touch screen to switch between the finger mode, the stylus mode, and the hybrid mode.

25. The touch terminal according to claim 24, wherein when the operating mode of the touch screen is the finger mode, the touch screen controller performs finger scanning in subsequent time slices.

26. The touch terminal according to claim 24, wherein when the operating mode of the touch screen is the stylus mode, the touch screen controller detects an excitation signal and a coded signal of the active stylus in subsequent time slices.

27. The touch terminal according to claim 24, wherein when the operating mode of the touch screen is the hybrid mode, the touch screen controller performs finger scanning in an Nth time slice, and in an (N+1)th time slice, sends the target operating frequency to the active stylus and detects a state of the active stylus to generate the stylus touch signal.

28. The touch terminal according to claim 23, wherein the touch screen controller is further configured to control a first area of the touch screen to send the pulse signal, and control a second area of the touch screen to send a reverse-phase pulse signal that has the same frequency as but an opposite phase to the pulse signal.

29. The touch terminal according to claim 28, wherein the first area is an upper half screen of the touch screen, and the second area is a lower half screen of the touch screen.

30. The touch terminal according to claim 28, wherein the second area is an area, of the touch screen, in contact with a palm of the user, and the first area is an area not in contact with the palm of the user.

31. The touch terminal according to claim 23, wherein the touch screen controller comprises a driving circuit, a timing control circuit, a multiplexer, a sensing circuit, and an operation decision module,
the sensing circuit is configured to receive touch information detected by the touch screen;
the operation decision module is configured to identify a touch mode of the user according to the touch signal so as to switch the operating mode of the touch screen; and
the timing control circuit is configured to control the driving circuit and the multiplexer to generate a timing signal on the touch screen so as to control the touch screen.

32. An active stylus, comprising:
a receiving unit, configured to receive a communication signal sent by a capacitive touch screen;
a decoding unit, configured to decode the communication signal so as to obtain a target operating frequency of the active stylus;
a signal generation unit, configured to generate a communication coded signal and an excitation signal;
a sending unit, configured to send the communication coded signal and a driving signal to a touch terminal after the active stylus is frequency-adjusted to the target operating frequency; and
a microprocessor,
configured to control, according to the target operating frequency, the signal generation unit to generate the communication coded signal and the excitation signal;
configured to control the sending unit to send multiple operating frequencies of the active stylus to the touch terminal for the touch terminal to determine the target operating frequency; and configured to adjust an operating frequency of the active stylus to the target operating frequency, so that the microprocessor controls the signal generation unit according to the target operating frequency;

after the active stylus establishes frame synchronization with the touch terminal according to the driving signal and the communication coded signal, the sending unit is configured to send a touch signal to the touch terminal.

33. A detection method, comprising following steps:

sending, by an active stylus, multiple operating frequencies of the active stylus to a touch terminal for the touch terminal to determine a target operating frequency;

detecting, by the active stylus, a communication signal sent by the touch terminal;

parsing, by the active stylus, the communication signal to determine the target operating frequency;

adjusting, by the active stylus, an operating frequency to the target operating frequency, so that the active stylus and the touch screen operate jointly at the target operating frequency;

sending a driving signal and a communication coded signal after the active stylus is frequency-adjusted to the target operating frequency; and sending a touch signal to the touch terminal after the active stylus establishes frame synchronization with the touch terminal according to the driving signal and the communication coded signal.

34. The detection method according to claim 33, wherein the detecting, by the active stylus, the communication signal sent by the touch terminal specifically comprises:

coding the target operating frequency and sending an obtained communication signal to the active stylus.

35. The detection method according to claim 33, wherein the active stylus and the touch screen operating jointly at the target operating frequency specifically comprises:

establishing, by the active stylus, frame synchronization with the touch terminal according to the target operating frequency, so that the active stylus and the touch screen operate jointly at the target operating frequency.

* * * * *